H. A. FORKNER.
LOCK DEVICE FOR AUTOMOBILES.
APPLICATION FILED JUNE 7, 1917.
1,261,016.
Patented Apr. 2, 1918.
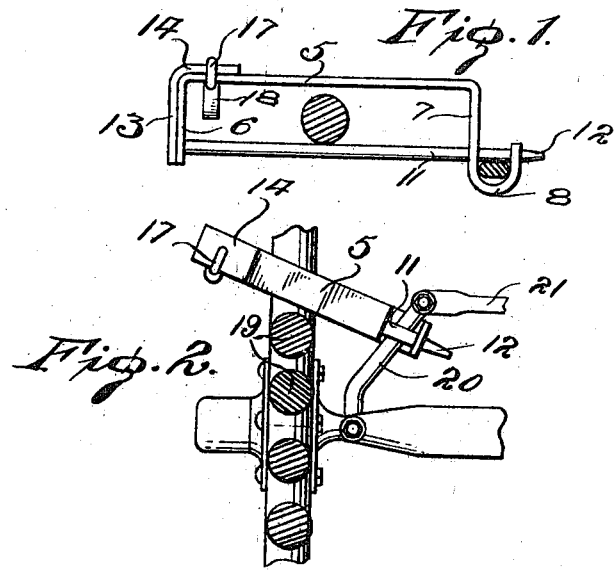
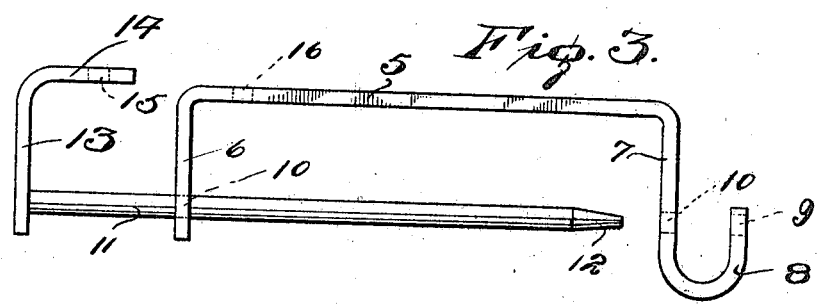

UNITED STATES PATENT OFFICE.

HENRY A. FORKNER, OF JOPLIN, MISSOURI.

LOCK DEVICE FOR AUTOMOBILES.

1,261,016.  Specification of Letters Patent.  Patented Apr. 2, 1918.

Application filed June 7, 1917. Serial No. 173,311.

*To all whom it may concern:*

Be it known that I, HENRY A. FORKNER, a citizen of the United States, residing at Joplin, in the county of Jasper and State of Missouri, have invented certain new and useful Improvements in Lock Devices for Automobiles, of which the following is a specification.

My invention relates to improvements in a lock device for engagement with relatively movable parts of an automobile, for preventing the fraudulent operation of the automobile.

An important object of the invention is to provide a device of the above mentioned character, adapted to engage with the spoke of a wheel and the steering crank, while not necessarily restricted to this use.

A further object of the invention is to provide a device of the above mentioned character, which is simple in construction, strong, durable, and convenient in use.

Other objects and advantages of the invention will be apparent during the course of the following description.

In the accompanying drawings, forming a part of this specification and in which like numerals are employed to designate like parts throughout the same, Figure 1 is a side elevation of the device, in use, Fig. 2 is a plan view of the same, and, Fig. 3 is an enlarged side elevation of the same, showing the parts thereof partly separated.

In the drawings, wherein for the purpose of illustration is shown a preferred embodiment of my invention, the numeral 5 designates an approximately U-shaped body portion of the device, comprising transverse arms or portions 6 and 7. The transverse arm or portion 7 is extended at its free end in the form of a U-shaped socket 8, which is faced in an opposite direction to the U-shaped portion 5. The free end of the socket 8 is provided with an opening or aperture 9, in alinement with openings 10, formed in the arms 6 and 7, as shown.

Adapted for insertion within and through the openings 9 and 10 is a pin or bolt 11, the free end of which is preferably tapered, as shown at 12. This pin or bolt serves to cover the open side of the U-shaped body portion and sockets 5 and 8, as shown.

The pin or bolt 11 is provided at its outer end with a transverse head 13, rigidly secured thereto, and carrying an ear 14, preferably disposed at a right angle thereto and extending longitudinally of the U-shaped body portion 5. The ear 14 is provided with an opening 15, adapted for registration with an opening 16, formed in the U-shaped body portion 5. When the openings 15 and 16 are in registration, they are adapted for the reception of a bolt 17 of a pad-lock 18. It is obvious that any other suitable form of lock may be employed.

The numeral 19 designates the spokes of the front wheel of an automobile, and 20 the steering crank, having connection with the usual drag link 21.

In use, the pin or bolt 17 is removed and the U-shaped body portion 5 moved to a position for the reception of the spoke 19, the crank 20 fitting in the U-shaped socket 8. The pin 11 is now inserted within and through the openings 9 and 10, thus securely confining the spoke and crank within these members, as is obvious. The bolt 17 of the lock 18 is now passed through the openings 15 and 16. It is obvious that the wheel and crank 20 are securely locked together and the machine cannot be operated until the lock 18 is removed from the device.

It is to be understood that the form of my invention herewith shown and described, is to be taken as a preferred example of the same, and that various changes in the shape, size, and arrangement of parts may be resorted to without departing from the spirit of the invention or the scope of the subjoined claims.

Having thus described my invention, I claim:

1. A device of the character described, comprising a bar bent to form an approximately U-shaped body portion having transverse ends, one end being extended and bent into an approximately U-shaped socket which is faced in an opposite direction to the approximately U-shaped body portion, the transverse ends of the approximately U-shaped body portion and socket having openings which are in alinement, a rod adapted for insertion within and through said openings, and means to lock the rod in the active position.

2. A device of the character described, comprising a bar bent to provide spaced transverse end members and an intermediate transverse member arranged between the end members, all of said transverse members having openings disposed near their ends which are in substantial alinement; a rod adapted to be threaded into the substantially alined openings; and means to lock the rod in the active position.

In testimony whereof I affix my signature in presence of two witnesses.

HENRY A. FORKNER.

Witnesses:
J. R. JAMESON,
W. L. MARTIN.